(12) United States Patent
Bora et al.

(10) Patent No.: US 11,891,066 B2
(45) Date of Patent: Feb. 6, 2024

(54) METHOD FOR CONTROLLING A VEHICLE

(71) Applicant: VOLVO TRUCK CORPORATION, Gothenburg (SE)

(72) Inventors: Teodoro Bora, Gothenburg (SE); Johan Fries, Gråbo (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 181 days.

(21) Appl. No.: 17/593,729

(22) PCT Filed: Mar. 26, 2020

(86) PCT No.: PCT/EP2020/058511
§ 371 (c)(1),
(2) Date: Sep. 23, 2021

(87) PCT Pub. No.: WO2020/193695
PCT Pub. Date: Oct. 1, 2020

(65) Prior Publication Data
US 2022/0194379 A1 Jun. 23, 2022

(30) Foreign Application Priority Data
Mar. 27, 2019 (WO) ................ PCT/EP2019/057720

(51) Int. Cl.
*B60W 30/188* (2012.01)
*B60W 40/06* (2012.01)
(Continued)

(52) U.S. Cl.
CPC .......... *B60W 30/188* (2013.01); *B60W 40/06* (2013.01); *G05D 1/0287* (2013.01);
(Continued)

(58) Field of Classification Search
CPC ............... B60W 30/188; B60W 40/06; B60W 2050/0026; B60W 2510/0638;
(Continued)

(56) References Cited

U.S. PATENT DOCUMENTS 5,646,844 A * 7/1997 Gudat .................. G05D 1/0297
701/50
6,359,403 B1 * 3/2002 Pollklas ............... F02D 41/0205
318/432
(Continued)

FOREIGN PATENT DOCUMENTS

| EP | 2617617 A2 | 7/2013 |
|---|---|---|
| WO | 2018106575 A1 | 6/2018 |

OTHER PUBLICATIONS

International Search Report and Written Opinion dated May 13, 2020 in corresponding International PCT Application No. PCT/EP2020/058511, 10 pages.
(Continued)

*Primary Examiner* — Sze-Hon Kong
(74) *Attorney, Agent, or Firm* — Venable LLP; Jeffri A. Kaminski

(57) ABSTRACT

The invention provides a method for controlling a vehicle (1) comprising a drivetrain comprising at least one drive device (2) adapted to generate mechanical power, the method comprising—controlling the vehicle to perform a mission comprising a plurality of stages (MS1-MS12), —collecting operational data relevant to the operation of the drivetrain, wherein the operational data indicate a de-rate of a component of the drivetrain, a fault of a component of the drivetrain, and/or an environmental condition which influences the drivetrain operation, —determining an expected mission stage (MS1-MS12), —determining, in dependence on the operational data, the propulsive capacity (CA1-CA3) in at least two different operational areas (A1-A3) of the
(Continued)

drive device (2), —mapping the operational area propulsive capacities (CA1-CA3) to the expected mission stage (MS1-MS12), and —controlling the vehicle (1) in dependence on said mapping.

18 Claims, 7 Drawing Sheets

(51) Int. Cl.
    *G05D 1/02*     (2020.01)
    *B60W 50/00*     (2006.01)

(52) U.S. Cl.
    CPC ............... *B60W 2050/0026* (2013.01); *B60W 2510/0638* (2013.01); *B60W 2510/0666* (2013.01); *B60W 2556/45* (2020.02); *B60W 2710/0644* (2013.01); *B60W 2710/0677* (2013.01)

(58) Field of Classification Search
    CPC ..... B60W 2510/0666; B60W 2556/45; B60W 2710/0644; B60W 2710/0677; G05D 1/0287; F02D 41/22; F02D 2250/26; F02D 11/105; F02D 2041/1412; F02D 2200/701; G07C 5/004
    See application file for complete search history.

(56) References Cited

U.S. PATENT DOCUMENTS

| | | | |
|---|---|---|---|
| 6,728,607 B1* | 4/2004 | Anderson | G05D 1/0219 701/25 |
| 8,106,753 B2 | 1/2012 | Vian et al. | |
| 9,014,873 B2 | 4/2015 | Braunstein et al. | |
| 10,860,016 B1* | 12/2020 | Wang | E02F 9/2054 |
| 2008/0208393 A1* | 8/2008 | Schricker | G08G 1/20 701/1 |
| 2009/0099886 A1* | 4/2009 | Greiner | G06Q 50/30 705/7.38 |
| 2010/0090525 A1* | 4/2010 | King | B60L 58/20 180/65.265 |
| 2010/0131122 A1* | 5/2010 | Dersjo | E02F 9/2253 701/2 |
| 2013/0000289 A1* | 1/2013 | Zhang | F15B 11/024 60/413 |
| 2013/0113433 A1* | 5/2013 | Shibata | G01R 31/392 320/134 |
| 2014/0121868 A1 | 5/2014 | Zhang et al. | |
| 2014/0278696 A1* | 9/2014 | Anderson | G06Q 10/047 705/7.23 |
| 2015/0232097 A1* | 8/2015 | Luther | B60W 30/188 701/1 |
| 2015/0361915 A1 | 12/2015 | Sujan et al. | |
| 2016/0057920 A1* | 3/2016 | Spiller | G05D 1/0287 701/50 |
| 2016/0097186 A1* | 4/2016 | Yamada | B60K 6/365 180/65.265 |
| 2017/0131718 A1* | 5/2017 | Matsumura | G05D 1/02 |
| 2018/0204161 A1* | 7/2018 | Sandulescu | G01R 31/382 |
| 2018/0347479 A1* | 12/2018 | Nakamura | F02D 41/021 |
| 2019/0122454 A1* | 4/2019 | Fukunaga | G08G 1/09 |
| 2019/0387671 A1* | 12/2019 | Umemoto | A01D 34/74 |

OTHER PUBLICATIONS

International Search Report and Written Opinion dated Dec. 13, 2019 in corresponding International PCT Application No. PCT/EP2019/057720, 13 pages.

International Preliminary Report on Patentability dated July 7, 2021 in corresponding International PCT Application No. PCT/EP2020/058511, 19 pages.

* cited by examiner

METHOD FOR CONTROLLING A VEHICLE

CROSS-REFERENCE TO RELATED APPLICATIONS

This application is a U.S. National Stage application of PCT/EP2020/058511, filed Mar. 26, 2020, and published on Oct. 1, 2020, as WO 2020/193695 A1, which claims priority to International Application No. PCT/EP2019/057720, filed Mar. 27, 2019 and published on Oct. 1, 2020 as WO/2020/192905 A1, all of which is hereby incorporated by reference in its entirety.

TECHNICAL FIELD

The invention relates to a method for controlling a vehicle. The invention also relates to a computer program, a computer readable medium, and a control unit.

The invention can be applied in heavy-duty vehicles, such as quarry trucks, mining trucks, road trucks and buses. The invention is not restricted to heavy-duty vehicles, but may also be used for other vehicles such as cars. Further, herein, the term vehicle is understood as also including working machines, such as wheel loaders, articulated haulers, excavators and backhoe loaders. Thus, the invention may also be used for working machines.

BACKGROUND

In a site, such as a quarry, a construction site, or a mine, there may be a plurality of vehicles performing tasks, or missions, in cooperation. Similarly, on roads or streets, there may be a plurality of vehicles forming parts of a transportation system, such as a city bus transportation system, or a system for delivery of goods. In such sites or systems, a malfunction on a vehicle may cause disruption to the mission of the vehicle, and also to the missions of other vehicles.

The propulsive system of a vehicle can be limited by a variety of environmental conditions, and/or affected by a variety of malfunction types. The propulsion system may include a driveline, which may include an internal combustion engine, and/or an electric motor. The driveline may also include an exhaust after treatment system for an engine in the driveline.

U.S. Pat. No. 9,014,873 discloses autonomous or semi-autonomous control of mobile machines, such as haul trucks, excavators, motor graders, at a worksite. Data is captured from the machines regarding machine performance. The document also mentions selectively triggering, based on the captured data, an event associated with an unexpected value for a monitored machine performance parameter (e.g., a malfunction). The response may involve implementing evasive maneuvering, e.g., slowing, stopping, load adjusting, and trajectory planning.

However, responses such as evasive maneuvering may cause disruption to the task of the malfunctioning vehicle, as well as the tasks of other vehicles in the site or system, and this may reduce the productivity of the vehicles. There is therefore a desire to improve responses to malfunctions in vehicles, cooperating with other vehicles, in a site or a transport system.

SUMMARY

An object of the invention is to increase the productivity of vehicles cooperating in a site or a transport system. A further object of the invention, is to improve responses to reduced capacities of vehicles, cooperating with other vehicles, in a site or a transport system.

The objects are reached with a method according to claim 1. Thus, the objects are reached with a method for controlling a vehicle comprising a drivetrain comprising at least one drive device adapted to generate mechanical power, the method comprising
    controlling the vehicle to perform a mission comprising a plurality of stages,
    collecting operational data relevant to the operation of the drivetrain, wherein the operational data indicate a de-rate of a component of the drivetrain, a fault of a component of the drivetrain, and/or an environmental condition which influences the drivetrain operation,
    determining an expected mission stage,
    determining, in dependence on the operational data, the propulsive capacity in at least two different operational areas of the drive device,
    mapping the operational area propulsive capacities to the expected mission stage, and
    controlling the vehicle in dependence on said mapping.
    The mission may be a cyclic mission.

It should be noted that the at least one drive device may be an internal combustion engine, an electric motor, or both, e.g. as in a hybrid drivetrain. Thus, the drivetrain may have an internal combustion engine as the single drive drive device adapted to generate mechanical power. In some embodiments, the drivetrain may be a hybrid drivetrain, e.g. with an internal combustion engine as well as an electric motor. In some embodiments, the drivetrain may be a fully electric drivetrain. The drivetrain may include additional components or devices such as a transmission, and an exhaust after treatment system.

The operational data may represent information regarding the drivetrain, and/or information on one or more conditions on which the drive train operation is dependent. The operational data may represent information regarding the operation of the drivetrain during the mission. In addition or alternatively, the operational data may represent information on one or more conditions during the mission on which the drivetrain operation is dependent.

The operational data may indicate a de-rate and/or a fault of a drivetrain component. A de-rate may be a reduction of the capacity of the component, compared to a maximum capacity of the component. A de-rate may be a reduction of the capacity of the component, compared to a rated capacity of the component. The rated capacity may be a capacity indicated by a manufacturer of the component.

As exemplified below, a fault may be referred to as a physical de-rate. The fault may be a malfunction of the component. The fault may be a failure of the component. The fault may be a partial fault. The fault may be a partial failure. Thereby, the capacity of the component may be partially reduced. Thus, the component may be functional at a reduced capacity. Alternatively, the fault may be a complete failure of the component. Thereby, the capacity of the component may be reduced by 100%. Thereby, the component may be completely dis-functional. Such a component may be regarded as 100% de-rated.

The de-rate of the drivetrain component may be introduced during the mission. Thus, the de-rate may not be present when the mission is started. Similarly, the fault of the drivetrain component may occur, or be introduced, during the mission. In some embodiments, the operational data, relevant to the operation of the drivetrain, is collected during the mission. Thereby, a de-rate and/or a fault of a drivetrain component, being introduced during the mission, may form a basis for determining the propulsive capacity in the at least two different operational areas of the drive device.

However, as exemplified below, in some embodiments, the operational data, relevant to the operation of the drivetrain, is collected before the mission. Thus, operational data indicating the de-rate or the fault may be collected during or before the mission.

The component, for which the operational data indicates a de-rate or a fault, may be any major or minor component of the drivetrain. For example, the component may be the drive device, e.g. an internal combustion engine. Further, the component may be a fuel system for the engine, a gearbox, an electric motor, or an electric storage arrangement, e.g. a battery pack. Further, the component may be a part of a major drivetrain component. For example, the component may be a valve, an actuator, a sensor, a bearing, a filter, or an electric connection, etc.

In some embodiments, the operational data indicate a de-rate of a single drivetrain component. In some embodiments, the operational data indicate a de-rate of a plurality of drivetrain components. In some embodiments, the operational data indicate a fault of a single drivetrain component. In some embodiments, the operational data indicate a fault of a plurality of drivetrain components.

In some embodiments, the operational data may indicate one or more environmental conditions which influence the drivetrain operation. Thus, the operational data, or parts thereof, may be such that it does not indicate whether components of the drivetrain are functional, but instead the data may indicate one or more environmental conditions, such as the ambient temperature, which may influence the drivetrain operation. The one or more environmental conditions may adversely influence the drivetrain operation.

Determining, in dependence on the operational data, the propulsive capacity in at least two different operational areas of the drive device, may comprise determining respective propulsive capacities in the at least two different operational areas of the drive device. As exemplified below, the operational areas may be respective intervals of a rotational speed of the drive device. As exemplified below, the propulsive capacities may be torque or power capacities of the drive device.

The drivetrain component de-rate and/or fault, or the environmental condition may reduce the propulsive capacity in one, some, or all, of the operational areas of the drive device. The propulsive capacity where no drivetrain component de-rate and/or fault, or no adversely influencing environmental condition, is present, may be referred to as a full capacity. The propulsive capacity in the at least two different operational areas of the drive device, determined in dependence on the operational data, may be lower than the full capacity. Determining the propulsive capacity in the at least two different operational areas of the drive device, may comprise adjusting or reducing the full capacity in at least one of the operational areas.

The mission stages may be characterized by features such as the level of load carried by the vehicle, and/or the inclination of a road travelled in the respective mission stage. The expected mission stage may be a mission stage which the vehicle is in, or a mission stage which the vehicle will enter. In some embodiments, only one mission stage is considered as an expected mission stage. In other embodiments, more than one mission stage may be regarded as expected mission stages. Thereby, the operational area propulsive capacities may be mapped to a plurality of expected mission stages. In some embodiments, all stages of the mission are regarded as expected mission stages, to which the operational area propulsive capacities are mapped. Thereby, the control of the vehicle may be adapted to a change in any of its operational area propulsive capacities, taking all missions stages into account.

The invention allows for combinations of different operational area propulsive capacities to be mapped, in dependence on the expected mission stage(s), to different responses by a vehicle control system, or a control unit. Thereby, a reduced capacity in one of the operational areas, may affect the mission implementation in a way that is less detrimental to the productivity, than responses according to prior art. The reason is that if the operational area with the reduced capacity is not critical, or less critical than other operational areas, to the expected mission stage, the vehicle can be allowed to continue through the expected mission stage(s), and thereby continue to contribute to the productivity of a plurality of cooperating vehicles.

The invention allows for determining the impact of each of the operational area propulsive capacities on the expected mission stage(s), and, based on the impacts, determine the best way to proceed. Thereby, improved responses to malfunctions in vehicles, cooperating with other vehicles, in a site or a transport system, is made possible. Thereby, the productivity of the vehicles may be increased.

Preferably, mapping the operational area propulsive capacities to the expected mission stage comprises comparing the operational area propulsive capacities to respective capacity threshold values of the expected mission stage. The capacity threshold values may be threshold values of the operational area propulsive capacities in the expected mission stage. Thereby, a quick decision may be made based on a simple comparison of the operational area propulsive capacities to the respective expected mission stage capacity threshold values. Based on the operational area propulsive capacities and the capacity threshold values, a re-planning of the mission may be done quickly.

Preferably, the method comprises selecting a plurality of capacity threshold values, each capacity threshold value providing a lower limit of an operational area propulsive capacity in a mission stage. Each capacity threshold value may provide a lower limit of the respective operational area propulsive capacity in a mission stage. In some embodiments, each capacity threshold value may provide a lower limit of one of the operational area propulsive capacities in one of the mission stages. The threshold capacities may be determined based on data regarding the respective mission stage. Such data may include one or more of a road inclination, a load of the vehicle, a minimum vehicle speed, and a minimum vehicle acceleration.

Preferably, mapping the operational area propulsive capacities to the expected mission stage comprises comparing an operational area propulsive capacity to the capacity threshold value of the operational area propulsive capacity and the expected mission stage. Mapping the operational area propulsive capacities to the expected mission stage may comprise comparing each operational area propulsive capacity to the respective capacity threshold value of the operational area propulsive capacity and the expected mission stage. Thereby, an effective way of assessing whether certain vehicle capacities suffice for certain mission stages is provided.

Preferably, determining the operational area propulsive capacities comprises calculating a value of the respective operational area propulsive capacity. Calculating a value of the respective operational area propulsive capacity, provides for labelling the capacity of each operational area with a single value. This provides for an evaluation and control of the vehicle with a relatively small use of computational resources.

The operational areas may be defined by respective different intervals of a rotational speed of the drive device. The operational areas may cover speed intervals that are adjacent to each other, one after the other.

Preferably, the number of operational areas is limited, e.g. to ten, five, three, or two. As suggested, preferably a single propulsive capacity is determined for each operational area. This, preferably the step of determining, in dependence on the operational data, the propulsive capacity in at least two different operational areas of the drive device, comprises determining the propulsive capacity in no more than ten, preferably no more than five, more preferably no more than three, operational areas of the drive device. Preferably, the operational areas are different from each other. Thereby, the step of determining, in dependence on the operational data, the propulsive capacity in at least two different operational areas of the drive device, may comprise determining no more than ten, preferably no more than five, more preferably no more than three, propulsive capacities. Thereby, the step of determining, in dependence on the operational data, the propulsive capacity in at least two different operational areas of the drive device, may comprise determining for each of the operational areas, a single respective propulsive capacity. This limits the amount of data processed for executing the method according to embodiments of the invention. However, it should be noted that in some embodiments, the number of operational areas of the drive device may be high, or even infinite. In the latter case, the propulsive capacities of the operational areas may form together a continuous torque curve, or a continuous power curve for the drive device.

Embodiments of the invention may comprise checking the capacity threshold values, which may be indicative of the capacity requirements, for a mission stage, within two or more engine/motor speed ranges. These capacity threshold values may be compared to the determined operational area propulsive capacities in these ranges, for example in the case of an engine/motor de-rate or fault.

The operational areas, for which the propulsive capacities are determined, may be the same regardless of the expected mission stage(s). However, in some embodiments the operational areas, e.g. engine or motor speed ranges, may be determined as operational areas in which the drive device will operate during the expected mission stage(s). Thereby, determinations of propulsive capacities throughout the entire speed range may not necessary.

The propulsive capacity value may be in any suitable parameter for representing the respective propulsive capacity. As exemplified below, the respective propulsive capacity may be in the form of available power and/or available torque of the drive device. In some embodiments, the propulsive capacity for each operational area may be in the form of available torque. In other embodiments, the propulsive capacity for each operational area may be in the form of available power. In some embodiments, there may be more than one operational area propulsive capacity value for one or more of the operational areas. For example, there could be, for a particular operational area, one capacity value in the form of available torque, and another capacity value in the form of available power. In further embodiments, the capacity values of different operational areas of the drive device may be represented by different parameters. For example, one or more of the operational areas may be represented by available torque, while one or more other operational areas may be represented by available power.

In embodiments where the drive device is an electric motor, a suitable amount of operational areas may be provided, for example two.

Preferably, as exemplified below, determining the operational area propulsive capacities comprises sampling a propulsive capacity at one or more sampling points within an operational spectrum of the drive device. Thereby, the one or more sampling points may be within an entire operational spectrum of the drive device. The operational areas may form different parts of the operational spectrum. The sampling points may be in at least one of the operational areas, and/or at at least one boundary of at least one of the operational areas. In dependence on one or more of the sampled propulsive capacities, a value of the respective operational area propulsive capacity may be calculated. Thereby, providing a relatively small number of sampling points are used, a quick establishment of the operational area propulsive capacities may be accomplished. The establishment of the operational area propulsive capacities may thereby be made with a relatively small computational effort, thereby reducing requirements on computational capacities of control devices arranged to carry out steps of the method according to embodiments of the invention.

The respective operational area propulsive capacity value may be expressed as a percentage of a full capacity. A 0% capacity may indicate no function capacity. Alternatively, a 0% capacity may indicate that the operational area is limited to a highest level of protection, in a component protection strategy. Such a component protection strategy may involve one or more levels of de-rating of components, or the drive device. For example, a 0% capacity may provide a torque curve, within an operational area, that is considered safe enough to allow temporarily running the drive device without disrupting any hardware in the event of a severe fault or malfunction.

As stated, in some embodiments, the operational data, relevant to the operation of the drivetrain, is collected during the mission. Thereby, a component de-rate or fault, or a change in one or more environmental conditions, being introduced during the mission, may form a basis for the determination of the propulsive capacity in the at least two different operational areas of the drive device.

As also stated, in some embodiments, the operational data, relevant to the operation of the drivetrain, is collected before the mission. For example, at a beginning of a mission, a cold start of an internal combustion engine of the drivetrain may result in a de-rate of the engine.

Embodiments of the invention allows for quantifying de-rating actions, herein also referred to as de-rates, in the drivetrain, by mapping them to the operational areas of the drive device, and to the expected mission stage. A de-rate, regardless of its type, may produce a reduced propulsive capacity value in one or more drive device operational area.

Some de-rates may be classified as software triggered de-rates. Thus, embodiments of the method may comprise collecting, during or before the mission, operational data indicating a de-rate triggered by a software. A software triggered de-rate may be triggered by software as a consequence of a fault or malfunction. A software triggered de-rate may be triggered by software as a manner to protect the drivetrain, or components or parts thereof, from the effects of environmental conditions, disturbances, or tough operation, (like cold start, or a high exhaust temperature).

A software which triggers a de-rate may be provided in a control unit of the vehicle. The de-rate triggering software may be arranged to provide the de-rate by reducing the propulsive capacity, for example the maximum torque, of the drive device. An example of a software triggered de-rate may be a result of a faulty sensor. Thereby the de-rate-triggering software may be arranged to de-rate the drive device upon determining the fault of the sensor. The sensor may be e.g. a back pressure sensor, a boost sensor pressure, or a fuel pressure sensor in an internal combustion engine, e.g. a diesel engine, of the drivetrain.

In some embodiments, the step of determining the propulsive capacity in the at least two different operational areas of the drive device, may comprise running the de-rate triggering software. Thereby, a simulation of running the drive device in the at least two different operational areas may be done. For example, a program comprising program code means could be provided, and adapted to run any of a plurality of de-rate-triggering softwares, to determine the respective propulsive capacities, at a plurality of different rotational speeds of the drive device. Such a program may have access to some, or all, of the softwares that can limit the propulsive capacity, e.g. the maximum torque. In some embodiments, wherein the collected operational data indicate a fault of a drivetrain component, the fault may be referred to as a physical de-rate. Thus, some de-rates may be referred to as physical de-rates. A physical de-rate may be a reduced capacity of one or more components of the drivetrain, due to a reduced physical functionality. Where the drive device is an engine, examples of such faults or malfunctions are unexpected charge losses in the intake/exhaust manifolds, turbo charger faults or malfunctions, back pressure device faults or malfunctions, diesel particle filter overloads, etc. The respective operational area propulsive capacity values in view of physical de-rates may be products of a mathematical model.

For physical de-rates, a problem, e.g. reduced airflow, might be identified, and a mathematical model may be used to determine the propulsive capacity in the at least two different operational areas of the drive device.

Embodiments of the invention may thus provide, in response to a de-rate, or a component fault, occurring before or during the mission, propulsive capacities in a plurality of different drive device operational areas. One or more or all of the propulsive capacities may be adjusted, in relation to respective full capacities, in dependence on the de-rate, or component fault. By mapping these operational area propulsive capacities to the expected mission stage(s), an adjustment of the control of the vehicle in said mission stages may be done quickly. A reason for this is that the capacities of different operational areas are readily available for decisions regarding the control of the vehicle in said mission stages.

Embodiments of the invention gives the possibility to provide a re-planned vehicle control, after the component de-rate or fault, or the adverse environmental condition, has been established. Embodiments of the invention allows this re-planning to be done quickly.

The respective operational area propulsive capacity values may be dependent on faults which are severe and demand immediate action. In some embodiments, a de-rate of a component of the drivetrain, indicated by the collected operational data, may be caused by a fault in a vehicle component other than the drivetrain component. Such a fault may not trigger any software de-rate action to protect the component. Also, such a fault may not affect the physical response of the drivetrain. However, such a fault may trigger a de-rate of the component, e.g. for safety reasons. Examples of such faults or failures are short circuits in a diesel engine preheater, a missing communication with an anti-lock braking system (ABS) controller, or a low compressed air pressure in a pneumatic vehicle wheel suspension system.

The operational data, collected before or during the mission, may indicate one or more environmental conditions which influence the drivetrain operation. Examples of environmental conditions which may influence the drivetrain operation may be the altitude of the vehicle, or the ambient temperature. A relatively high altitude, or a relatively high ambient temperature, will reduce the density of ambient air. This may reduce the capacity of an internal combustion engine of the drivetrain. An adversely affected drivetrain operation, caused by one or more environmental conditions, may be referred to as a physical de-rate.

Environmental conditions may change during the mission. Thereby, collecting environmental data during the mission allows for an adjustment of the drive device operational areas propulsive capacities in dependence on the changing environmental conditions. By mapping these adjusted propulsive capacities to the expected mission stage(s), an adjustment of the control of the vehicle in said mission stages may be done quickly.

Environmental conditions may be different from one mission to another. Thereby, collecting environmental data before the mission allows for an adjustment of the drive device operational areas propulsive capacities in dependence on the environmental conditions at the mission to be carried out.

In some embodiments, the method comprises performing one or more simulations of operations of the drivetrain with one or more simulated de-rates of one or more components of the drivetrain, one or more simulated faults of one or more components of the drivetrain, and/or one or more simulated environmental conditions which influence the drivetrain operation. Thereby, the method may further comprise determining, for each of the simulated drivetrain operations, respective virtual propulsive capacities in the at least two different operational areas of the drive device. Thereby determining, in dependence on the operational data, the propulsive capacity in at least two different operational areas of the drive device may comprise selecting the propulsive capacities from said virtual propulsive capacities.

Thus, the propulsive capacities may be selected from said virtual propulsive capacities. For this, the method may comprise identifying from said simulated de-rates, simulated faults, and/or simulated environmental conditions, a simulated de-rate, a simulated fault, and/or a simulated environmental condition corresponding to the de-rate, the fault, and/or the environmental condition indicated by the collected operational data. The identified simulated de-rate, fault and/or environmental condition may be substantially the same as, or equal to, the de-rate, the fault, and/or the environmental condition indicated by the collected operational data. Thereby, determining, in dependence on the operational data, the propulsive capacity in at least two different operational areas of the drive device, may comprise selecting the virtual propulsive capacities of the identified simulated de-rate, the identified simulated fault, and/or the identified simulated environmental condition.

The drivetrain operations simulations may be done before controlling the vehicle to perform the mission.

As suggested, determining the operational area propulsive capacities may comprise sampling a propulsive capacity at one or more sampling points within an operational spectrum of the drive device. The operational spectrum may be a spectrum of rotational speeds of the drive device.

In some embodiments, the propulsive capacity sampling may be done before the mission. The sampling may be done in a test rig of the drive device, with a mathematical model of the drive device, or at previous operations of the vehicle, or other vehicles, e.g. of the same make and model. The propulsive capacity sampling may be done for a plurality of simulated drivetrain component de-rates or faults, or simulated adverse environmental conditions. The propulsive capacity in the at least two different operational areas, e.g. rotational speed intervals, of the drive device, may be determined in dependence on the sampled propulsive capacities. The sampled propulsive capacities, or capacities determined in dependence on the sampled capacities, such as the operational area propulsive capacities, may be stored accessible to a control unit of the vehicle. The stored propulsive capacities may be correlated with a respective component de-rate or fault, or simulated adverse environmental condition. Thereby, determining the operational area propulsive capacities may comprise retrieving, from a data storage, stored values of the sampled propulsive capacities, or capacities determined in dependence on the sampled capacities, such as the operational area propulsive capacities.

In some examples, the capacity sampling may be done with a model simulating a de-rate. E.g., for an internal combustion engine, a capacity, e.g. in the form of an available torque, may be calculated for a plurality of engine speed values, based on the back pressure, the boost pressure, and the fuel pressure. For example, the back pressure, the boost pressure, and the fuel pressure may be kept constant, while the engine speed is varied, to obtain a curve with the available torque In other examples, a test rig, e.g. of the drive device or the drivetrain, may be used. At a component de-rate or fault, a backup solution may be used. For example, if a fuel rail sensor fails in a diesel engine, the controller can switch to an open loop control, providing a constant pressure. The test rig can be run with the backup solution. Thereby, the engine may be operated at different speeds, and the available torque may be sampled, i.e. measured, e.g. with an electric machine providing a counter torque. Thereby, the propulsive capacity at a plurality of operational areas may be determined. Thereby, there capacities may be stored accessible to a control unit of the vehicle, and correlated with the particular component de-rate or fault. Thereby, determining the operational area propulsive capacities may comprise retrieving, from a data storage, stored values of the sampled propulsive capacities, or capacities determined in dependence on the sampled capacities, such as the operational area propulsive capacities.

In other embodiments, at a certain drive device rotational speed, a determination of an actual value of a drive device propulsive parameter, e.g. the torque, is made during the mission. Also, a simultaneous requested value of the propulsive parameter is determined.

The requested value may be given by a control unit for the drive device. The requested value may be less that a maximum requested value, e.g., depending on the driving conditions. A ratio of the actual value to the requested value could be determined. The propulsive capacity at the rotational speed may be determined as the full capacity multiplied by said ratio. Thereby, the propulsive capacity may be sampled. This may be repeated for different drive device rotational speeds.

The value of the respective operational area propulsive capacity may be calculated, in dependence on one or more of the sampled propulsive capacities, in any suitable manner. For example, the smallest sampled propulsive capacity in an operational area may be chosen as indicating the propulsive capacity for that area. Alternatively, all sampled propulsive capacities of an operational area may be used to numerically calculate the integral of the operational area. Thereby, the capacity of the operational area may be a ratio between an actual integrated value and an ideal integrated value. The actual integrated value is understood as the integral of sampled actual capacities, and the ideal integrated value is understood as the integral of intact capacities. As a further example, the respective operational area propulsive capacity value may be calculated as the average capacity of all sampled propulsive capacities of the operational area.

It should be noted that the respective operational area propulsive capacity value does not necessarily have to be restricted to a positive value. The propulsive capacity value may be negative. For example, a 0% capacity may indicate the capacity having reached the most severe level of an engine protection scheme. However, in some cases, it is possible for the capacity to become even lower, and to thereby assume a negative value. In other embodiments, a 0% capacity may mean a total loss of capacity, e.g. zero available torque.

Controlling the vehicle in dependence on said mapping may comprise defining a speed profile for the vehicle in dependence on said mapping. Thus, the speed profile may be defined based on the operational area capacities and the expected mission stage. The speed profile may include values of the vehicle speed at positions along the one or more expected mission stages. Defining the speed profile may involve adjusting a speed profile. Such a speed profile definition may provide a simple and accurate way of implementing a response to a reduced capacity in one or more of the operational areas. It should be noted that the defined speed profile may be used by a predictive cruise control algorithm of the vehicle, to optimize gear selection and/or torque demand calculations.

In some embodiments, a steering profile of the vehicle may be defined in dependence on said mapping.

Controlling the vehicle in dependence on said mapping may comprise re-planning the mission in case of a de-rate. The propulsive capacities of the drive device operational areas, e.g. throughout the entire engine/motor speed range, provides for such a re-planning to be made quickly. The re-planning may involve moving the vehicle to a specified position ahead, and then stopping the vehicle. The adjusted propulsive capacities in a plurality of operational areas allows for evaluating such a plan quickly.

In some embodiments, the propulsive capacity operational areas comprise a first area within a drive device rotational speed interval including rotational speeds at take-off maneuvers of the vehicle. This is advantageous where the drive device is an internal combustion engine, for example a diesel engine. Thereby, an operational area is defined, the capacity of which is particularly important for take-off maneuvers of the vehicle, and during transients. In a diesel engine, the first area may cover, as exemplified below, a speed interval from the low idle speed up to what is known as the lower knee of the engine torque curve.

The vehicle may be a load carrying vehicle, and the mission may include a loading procedure. The mission may further include an un-loading procedure. As an example, the method may comprise selecting a first capacity threshold value as a lower limit of the first area propulsive capacity in the expected mission stage, which first capacity threshold value is at least partly based on an expected loading procedure of the vehicle in the expected mission stage. Thereby, if the first area propulsive capacity is below the first capacity threshold value, controlling the vehicle in dependence on said mapping may comprise avoiding the loading procedure. Thus, the first capacity threshold value is preferably assigned to the combination of the expected mission stage, and the first operational area. Thereby, the mapping of the reduced capacity in the operational area, that is used for maneuvers used at loading procedures, to a loading mission stage, may accurately point to a suitable response. Avoiding the loading procedure may entail terminating the mission. Thus, although the capacities in other operational areas, e.g. including maximum power or torque, may be intact capability, the mission of the vehicle may be terminated, since the reduced take-off and transient response capacity may affect the operation of other vehicles on the same mission. For example, the loading mission stage may include the use of a loading area which allows only a single vehicle to be present at any point in time. If a vehicle can not move away from the area, other vehicles will not be able to access it.

In a further example, if the expected mission stage is a stage which includes an un-loading procedure of the vehicle, and if the propulsive capacity in the first area is above a second capacity threshold value, controlling the vehicle in dependence on said mapping comprises effecting the un-loading procedure. It should be noted that, if the expected mission stage includes un-loading, and the take-off capacity of the vehicle is reduced, the capacity may be too low for a take-off maneuver while loaded, but high enough for such a maneuver while un-loaded. Therefore, the vehicle may be allowed to continue at least a portion of the mission.

In some embodiments, the propulsive capacity operational areas comprise a second area within a drive device rotational speed interval including a maximum torque of the drive device. This is advantageous where the drive device is an internal combustion engine, for example a diesel engine. Thereby, an operational area is defined, the capacity of which is particularly important for maneuvers such as uphill driving while fully loaded. In a diesel engine, the second area may cover, as exemplified below, a speed interval from the lower knee up to what is known as the higher knee on the torque curve. Preferably the capacity parameter used for the second area is available torque.

In some examples, the method comprises selecting a third capacity threshold value as a lower limit of the second area propulsive capacity in the expected mission stage, which third capacity threshold value is at least partly based on an expected vehicle load in the expected mission stage, and/or an uphill road gradient of the expected mission stage. If the propulsive capacity in the second area is below the third capacity threshold value, controlling the vehicle in dependence on said mapping may comprise reducing the vehicle speed in the expected mission stage. Thus, the third capacity threshold value may be assigned for the combination of the second area and the expected mission stage. Thereby, the mapping of the reduced capacity in the operational area, that is used for uphill and loaded driving, to an uphill and loaded mission stage, may accurately point to a suitable response. For example, if the maximum torque is reduced, but the take-off and transient response capacities are intact, the vehicle may be allowed to continue its mission, e.g. with a reduced speed, if the available torque allows it in view of the expected mission stage(s).

In some embodiments, if the propulsive capacity in the second area is below the third capacity threshold value, controlling the vehicle in dependence on said mapping may comprise terminating the mission. This may be done e.g. if the maximum torque is reduced, and the take-off and transient response capacities are also reduced. When terminating the mission, the vehicle may be left in a position so as to not be an obstacle for other vehicles. The vehicle may be moved by means of another vehicle to a repair facility, or it may be repaired in the position where it was left.

Preferably, the propulsive capacity operational areas comprise a third area within a drive device rotational speed interval including a maximum power of the drive device. This is advantageous where the drive device is an internal combustion engine, for example a diesel engine. Thereby, an operational area is defined, the capacity of which is particularly important for maneuvers such as quickly increasing the speed of the vehicle. A further maneuver, for which the capacity of the third area is important, is fast uphill driving. In a diesel engine, the third area may cover, as exemplified below, a speed interval from the higher knee on the torque curve up to the high idle speed. The capacity parameter used for the third area may be available power and/or available torque.

In some embodiments, the propulsive capacity operational areas comprise an area with engine braking of the drive device. For example, the vehicle may be provided with an engine brake device, such as an exhaust flap. At a fault of the exhaust flap, the engine brake torque capacity may be reduced. The propulsive capacity of the engine braking operational area may be an engine braking capacity of the vehicle. The engine braking capacity of the vehicle may be regarded as a propulsive capacity with a negative value. Thereby, for example, the method may comprise selecting a fourth capacity threshold value as a lower limit of the engine braking capacity in the expected mission stage, which fourth capacity threshold value is at least partly based on an expected vehicle load in the expected mission stage, and/or a downhill road gradient of the expected mission stage. The vehicle may be controlled in dependence on the engine braking capacity and the fourth capacity threshold value. For example, if the engine brake propulsive capacity in the engine braking area is below the fourth capacity threshold value, controlling the vehicle in dependence on said mapping may comprise adjusting or terminating the mission if the vehicle is loaded above a load threshold value, and carrying out the expected mission stage if the vehicle is loaded below the load threshold value. If a positive propulsive capacity of the drive device is sufficient, adjusting the mission may comprise driving the vehicle along a different route, or turning the vehicle around and driving it in an opposite direction with an uphill road gradient. Thereby, a suitable response may be provided in dependence on the load of the vehicle.

In some embodiments, a method of controlling a plurality of vehicles is provided, the method comprising controlling a first of the vehicles according to any embodiment described or claimed herein, controlling the remaining vehicles to perform said mission, and controlling at least one of the remaining vehicles in dependence on said operational area propulsive capacities and/or said mapping of the first vehicle. Thereby, an accurate response, of one or more of the remaining vehicles, to a reduced operational area capacity, and expected mission stage, of the first vehicle, may be provided. Such a response may include altering the mission of said one or more of the remaining vehicles, such that it can be carried out without being interrupted to terminated, due to the reduced operational area capacity, and expected mission stage, of the first vehicle. Thereby, a severe reduction of the productivity of the vehicles may be avoided.

The objects are also reached with a computer program according to claim 26, a computer readable medium according to claim 27, or a control unit or a group of control units according to claim 28.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
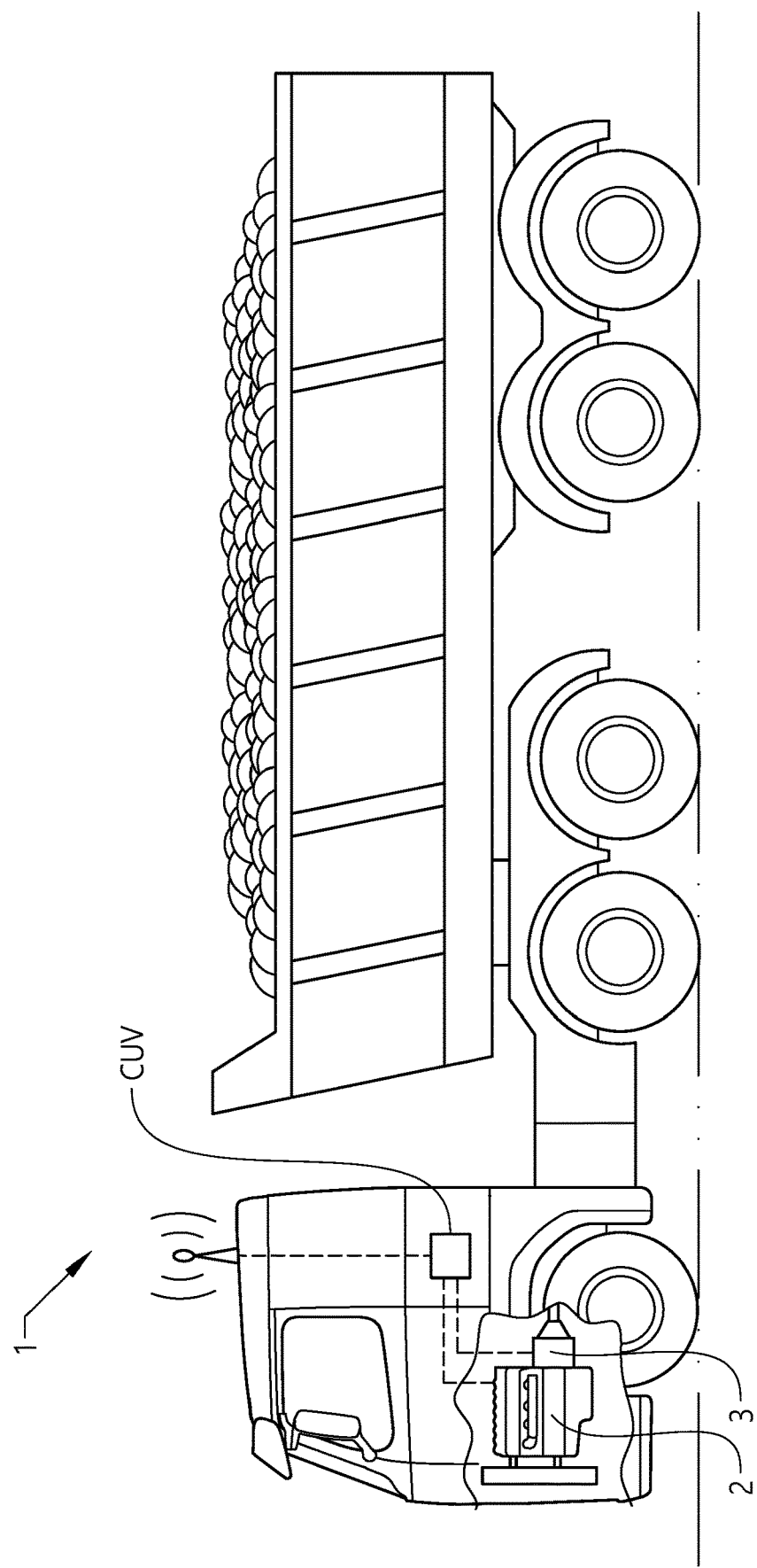
FIG. 1 shows a vehicle in the form of a truck.

FIG. 1 depicts a heavy-duty vehicle 1 in the form of a truck. The truck comprises a drivetrain. The drivetrain comprises a drive device 2 in the form of an internal combustion engine. In this example the engine is a diesel engine. The drivetrain also comprises a gearbox 3.

Figure 2:
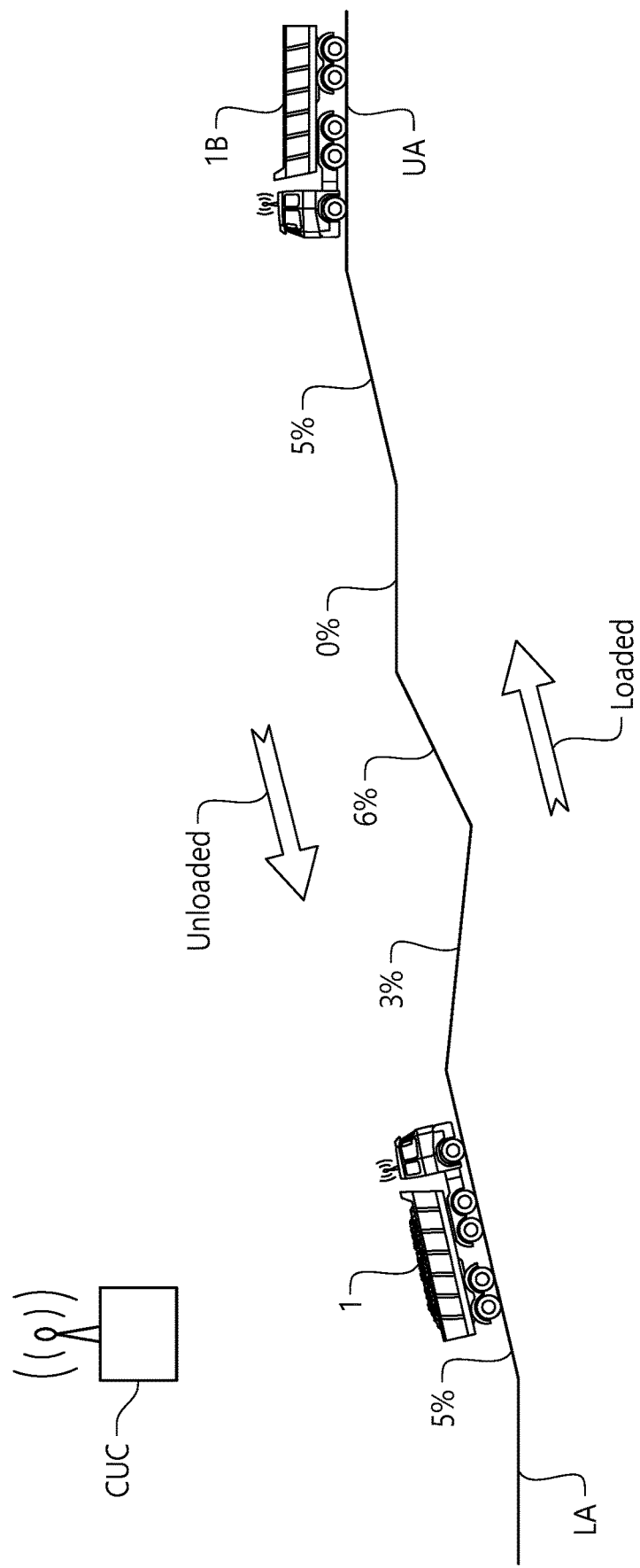
FIG. 2 shows a schematic vertical cross-section along a route travelled by a plurality of vehicles such as the one in FIG. 1.

FIG. 2 depicts a route, on a road, on which vehicles 1, 1B, as the one shown in FIG. 1, perform repeated cycles in a mission. The vehicles are cooperating in moving material from a loading area LA to an un-loading area UA. In this example, the route is partly in a quarry. However, the route could be in any type of environment, such as in a construction site, along an urban road, and/or along a rural road. Also, the invention is applicable to a variety of vehicle mission types. Further, the vehicles may be of any type suitable for the particular mission. For example, the vehicles may be mining trucks, delivery vans, buses, or cars. In FIG. 2, only two vehicles 1, 1B are shown for simplicity of the presentation. However, it should be noted that embodiments of the invention is applicable to vehicle fleets with any number of vehicles.

As understood from FIG. 2, the vehicles 1, 1B are loaded in the loading area LA. The vehicles travel loaded from the loading area LA to the unloading area UA. The vehicles are unloaded at the unloading area UA. The vehicles travel unloaded from the unloading area UA to the loading area LA. Thus, the cycles involve driving on the road, from the loading area LA to the unloading area UA, and back along the same road to the loading area. Hence, the vehicles 1, 1B move in both directions along the road. Thus, the mission could be referred to as a circulating mission.

In some examples, only one vehicle at the time can load at the loading area LA. In some examples, only one vehicle at the time can unload at the unloading area UA. In general, the route could include any number of positions for respective specified activities. The activities could be of any suitable alternative type, for example delivery or pick-up of goods or people, or fueling and/or charging of batteries of the vehicles. Any of such positions may be arranged so that only one vehicle at the time can be present to perform the respective activity. The road may have double lanes, allowing vehicles to meet. In some examples, the road may have, between the loading area LA and the unloading area UA, one or more portions with a single lane, in which vehicles driving in opposite directions cannot meet.

A group of control units are arranged to carry out steps of a method according to an embodiment of the invention. The control units comprise a central control unit CUC. The central control unit CUC may be part of a control center for controlling the vehicles 1, 1B. As depicted in FIG. 1, the control units further comprise vehicle control units CUV. The vehicle control units CUV may be provided in the form of a single physical device, or a plurality of devices, arranged to communicate with each other. The vehicle control units CUV are arranged to control the respective drivetrain 2, 3. The vehicle control units CUV are arranged to collect operational data from the respective drivetrain, as exemplified below. The central control unit CUC is arranged to communicate wirelessly with each of the vehicle control units CUV.

The central control unit CUC may be arranged to receive information from the vehicles 1, 1B, e.g. regarding their positions, and speeds. The central control unit CUC may also be arranged to send control commands to the vehicles. In some embodiments, the vehicles are driverless, i.e. arranged for autonomous control. Thereby, the vehicle control units CUV may be arranged to control operational devices of the vehicles, such as engines, motors, brakes and steering. Further, the vehicle control units CUV may be arranged to read the control commands from the central control unit CUC. In other embodiments, the vehicles may be arranged to display control commands from the central control unit CUC, to drivers of the vehicles.

In some embodiments, the central control unit CUC could be located on one of the vehicles 1, 1B, or parts of the central control unit CUC could be distributed in a plurality of the vehicles.

It is understood that the control units CUC, CUV comprise computers. It is further understood that the control units CUC, CUV may be arranged to carry out an embodiment of the method according to the invention, by means of a computer program.

Each cycle performed by the vehicles 1, 1B comprises a plurality of stages MS1-MS12. As can be seen in FIG. 2, the road between the loading area LA and the unloading area UA comprises portions with respective inclinations, indicated in percent; (the angles of the lines depicting the road in FIG. 2 are exaggerated for a simplicity of the presentation). The road portions present, with the loading area LA and the unloading area UA, and the loaded and unloaded conditions, the cycle stages MS1-MS12, as presented in table 1 below. As can be seen in table 1, a plurality of capacity threshold values Ta-Tak are selected. The capacity thresholds will be explained below.

TABLE 1

Mission stages along the route in FIG. 2.

| Stage | Description | A1 capacity threshold | A2 capacity threshold | A3 capacity threshold |
|---|---|---|---|---|
| MS1 | Loading | Ta | Tb | Tc |
| MS2 | 5% uphill, loaded | Td | Te | Tf |
| MS3 | 3% downhill, loaded | Tg | Th | Ti |
| MS4 | 6% uphill, loaded | Tj | Tk | Tl |
| MS5 | Flat, loaded | Tm | Tn | To |

TABLE 1-continued

Mission stages along the route in FIG. 2.

| Stage | Description | A1 capacity threshold | A2 capacity threshold | A3 capacity threshold |
|---|---|---|---|---|
| MS6 | 5% uphill, loaded | Tp | Tq | Tr |
| MS7 | Unloading | Ts | Tt | Tu |
| MS8 | 5% downhill, unloaded | Tv | Tx | Ty |
| MS9 | Flat, unloaded | Tz | Taa | Tab |
| MS10 | 6% downhill, unloaded | Tac | Tad | Tae |
| MS11 | 3% uphill, unloaded | Taf | Tag | Tah |
| MS12 | 5% downhill, unloaded | Tai | Taj | Tak |

Figure 3:
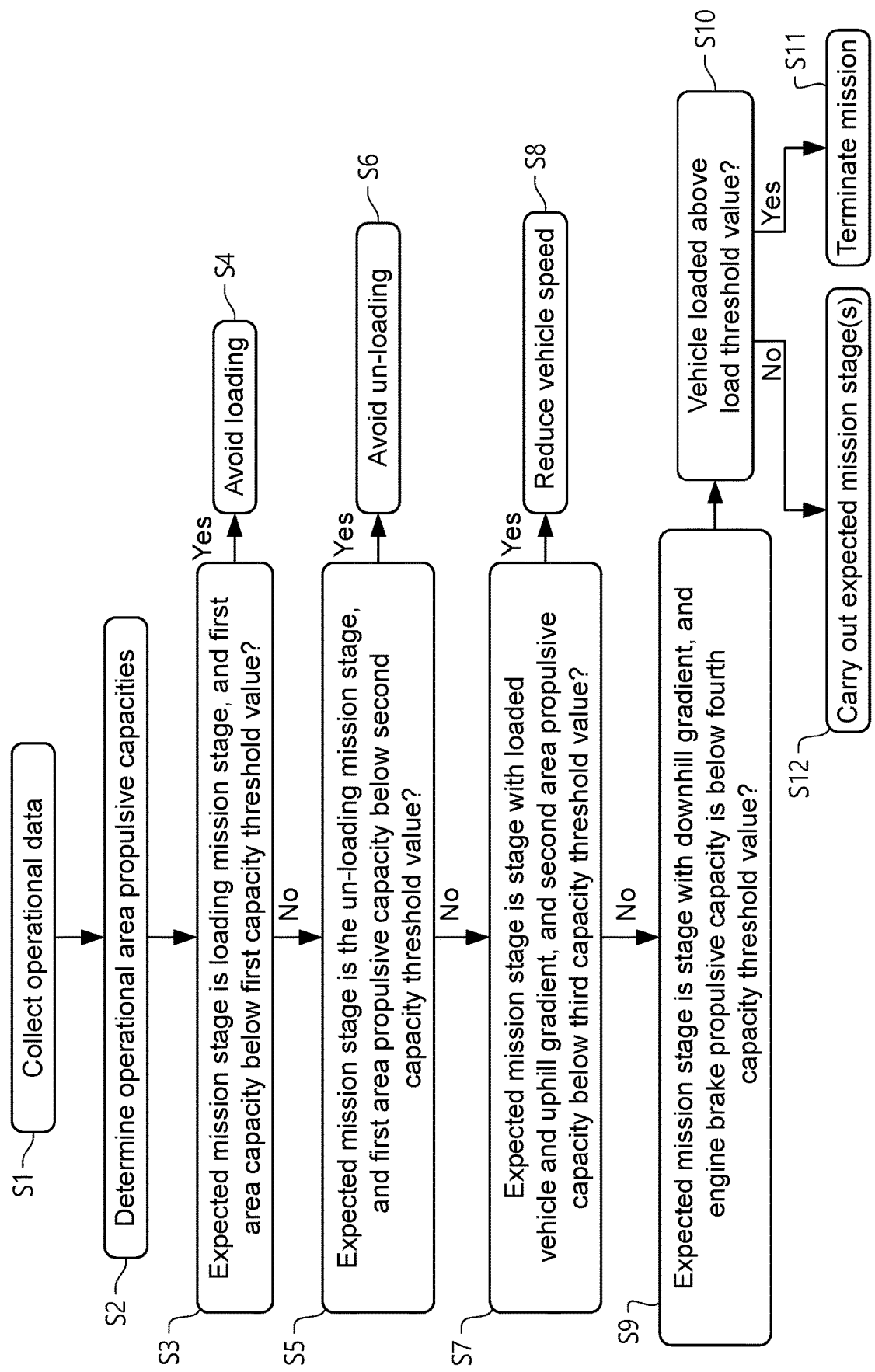
FIG. 3 is a flow diagram depicting stages in a method according to an embodiment of the invention.

Referring to FIG. 3, a method according to an embodiment of the invention will be described.

The method comprises collecting S1 in each of the vehicles 1, 1B, during the mission, operational data relevant to the operation of the respective drivetrain 2, 3. This operational data collection may be done by the respective vehicle control unit CUV, (FIG. 1). The operational data collection may be done by means known per se, for example sensors for the engine speed, the engine temperature, the engine fuel supply rate, the engine air supply rate, the gearbox gear selection, etc. The operational data may further include the temperature of one or more components in an exhaust after treatment system (EATS) for the engine. The operational data may include values of further parameters which are relevant to the operation of the drivetrain, such as the load of the vehicle. The load of the vehicle may be determined in a manner which is known per se, e.g. on the basis of a sensed pressure in a pneumatic wheel suspension system. Examples of further parameters included in the operational data are ambient temperature, quality of sensors and actuators (electric and plausibility), service brake temperature, engine and gearbox plausibility diagnostics, and engine and gearbox calibration (calibration parameters defining operating conditions and limits).

Figure 4:
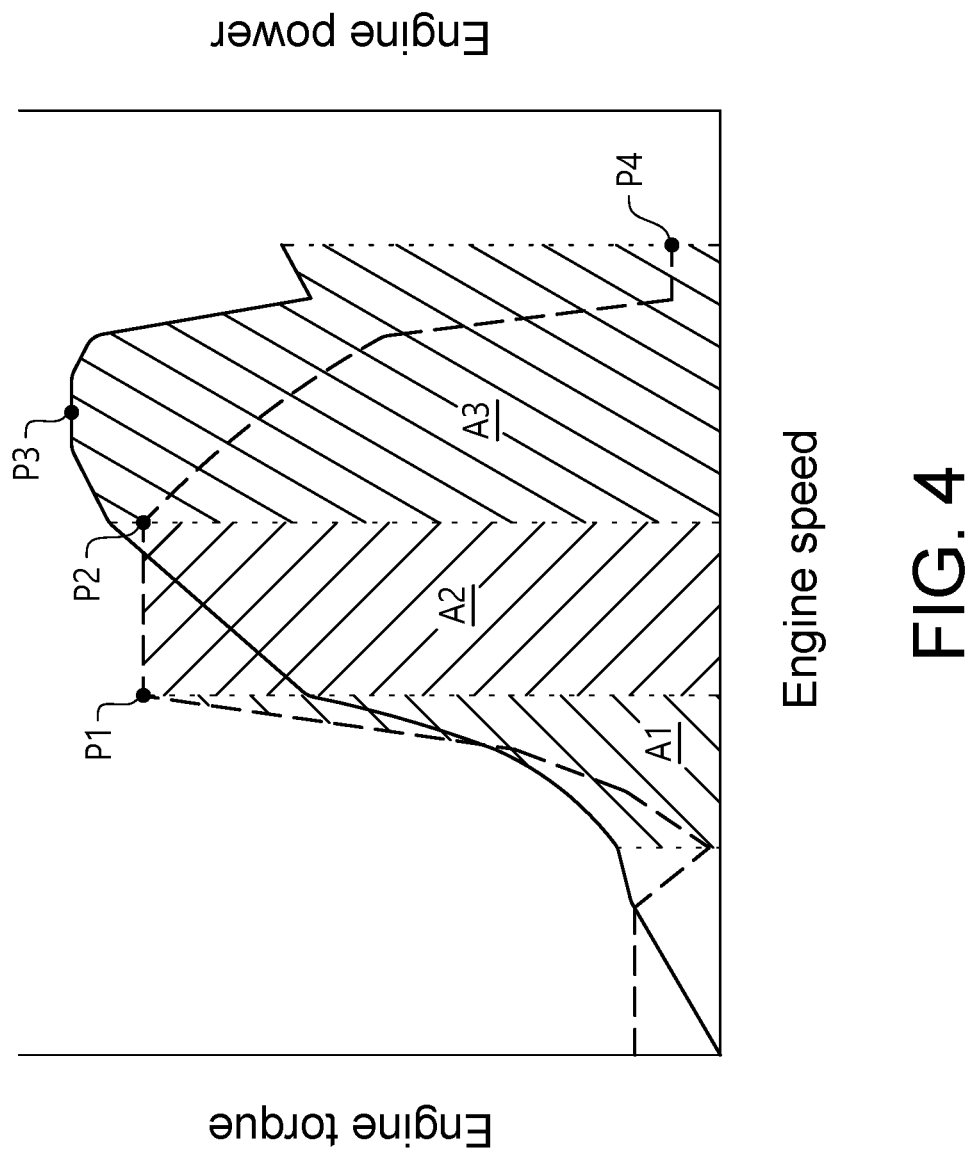
FIG. 4-FIG. 6 are diagrams depicting the torque and power of an engine of the truck in FIG. 1, as functions of engine speed

Reference is made also to FIG. 4. The method further comprises determining S2, in dependence on the operational data, the propulsive capacity CA1-CA3 in three different operational areas A1-A3 of the engine 2.

Said areas comprise a first area A1 within an engine speed interval including rotational speeds at take-off maneuvers of the vehicle 1. The engine speed interval of the first area A1 may also include transients after gear shifts of the vehicle 1. The reason is that certain gear shifts might result in relatively low engine speeds, which may impact the engine speed recovery. The engine speed after a gear sift may depend on the gearbox calibration and/or road conditions.

A second area A2 is within an engine speed interval including a maximum torque of the engine 2. In this example, the second area A2 extends from what is known, on a diesel engine torque curve, as the lower knee, indicated in FIG. 4 as P1, to the upper knee, indicated as P2.

A third area A3 is within an engine speed interval including a maximum power of the engine 2. A point on the power curve is indicated as P3 in FIG. 4. The third area A3 is limited at an upper end of the speed interval by a high idle point of the torque curve, indicated in FIG. 4 as P4. The first and third areas A1, A3 are adjacent to the second area A2.

Figure 5:
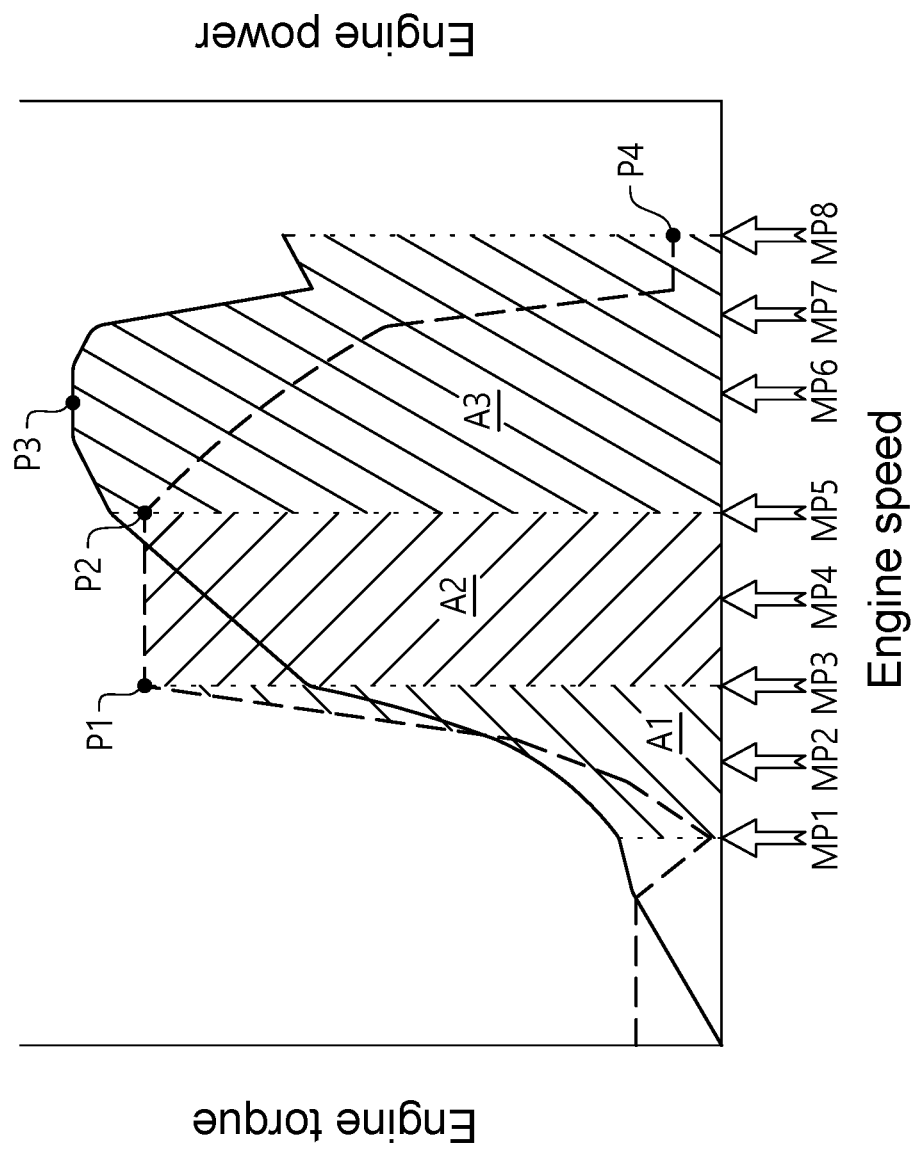

Reference is made also to FIG. 5. The determination comprises sampling a propulsive capacity at a plurality of sampling points MP1-MP8 distributed in the areas A1-A3, and at boundaries of the areas. Thus, each sampling point is at a respective predetermined engine speed. In this example, the propulsive capacity comprises two parts: engine torque capacity and engine power capacity. As is known, torque and power are directly correlated by the engine speed. In some embodiments, only the torque capacity, or only the power capacity, are sampled. For example, each sampling point may be at a respective predetermined engine speed, and may provide a power capacity at the respective engine speed.

In this example, at each sampling point, values of the engine torque capacity and engine power capacity are calculated, e.g. as has been exemplified above. Thereby, a de-rate of the torque may be detected. A de-rate may be understood as a limit imposed on the engine operation. A torque de-rate may a software triggered de-rate, or a physical de-rate.

A software triggered de-rate may be a torque limit that is controlled by a software, or a computer program, of the respective vehicle control unit CUV. A software triggered de-rate may be calculated by running a function in the software, for each engine speed sampling point.

As an example, a software triggered de-rate may be imposed for engine protection. Such a de-rate may limit the torque to a pre-defined level, which may be predetermined, in the event of a fault or malfunction in a sensor and/or an actuator. Such a fault or malfunction may result in vital information about not being available. For example, if an exhaust temperature sensor is not working, the torque may be limited to avoid possible damages in the exhaust manifold.

Another example of a software triggered de-rate may be provided for cold conditions. Thereby, the engine torque may be limited to avoid high emissions, and/or to protect fuel injection components. A further example of a software triggered de-rate may be a torque limit provided by a gear selection; such a limit may be imposed to safe fuel. Yet another example of a software torque de-rate may be imposed in view of an oil or coolant temperature, to protect the engine.

A physical de-rate may be a torque limit that is imposed by environmental conditions. Such a de-rate may be out of the control of the vehicle control unit software. A physical de-rate may be estimated from a mathematical model. Examples of a physical de-rate may be a low engine boost pressure, e.g. due to a faulty closed-loop control, an actuator fault or malfunction. A further example of a physical de-rate may be a low engine boost pressure due to a high altitude. Thus, a physical de-rate may be the result of one or more environmental conditions which influence the drivetrain operation. A further example may be a low fuel rail pressure, e.g. due to a faulty closed-loop control, or a sensor/actuator fault or malfunction. Yet another example of a physical de-rate may be a low pressure system of the engine, e.g. a low pressure fuel system, being partially faulty or malfunctioning, e.g. due to clogging.

As exemplified above, a mathematical model or a test rig may be used, before the mission, to determine available torques at a plurality of simulated component de-rates or faults. These available torques may be stored accessible to the vehicle control unit CUV, and correlated to respective component de-rates. Thereby, during the mission a de-rate or fault may be identified, and the correlated available torques may be retrieved by the control unit.

Figure 6:
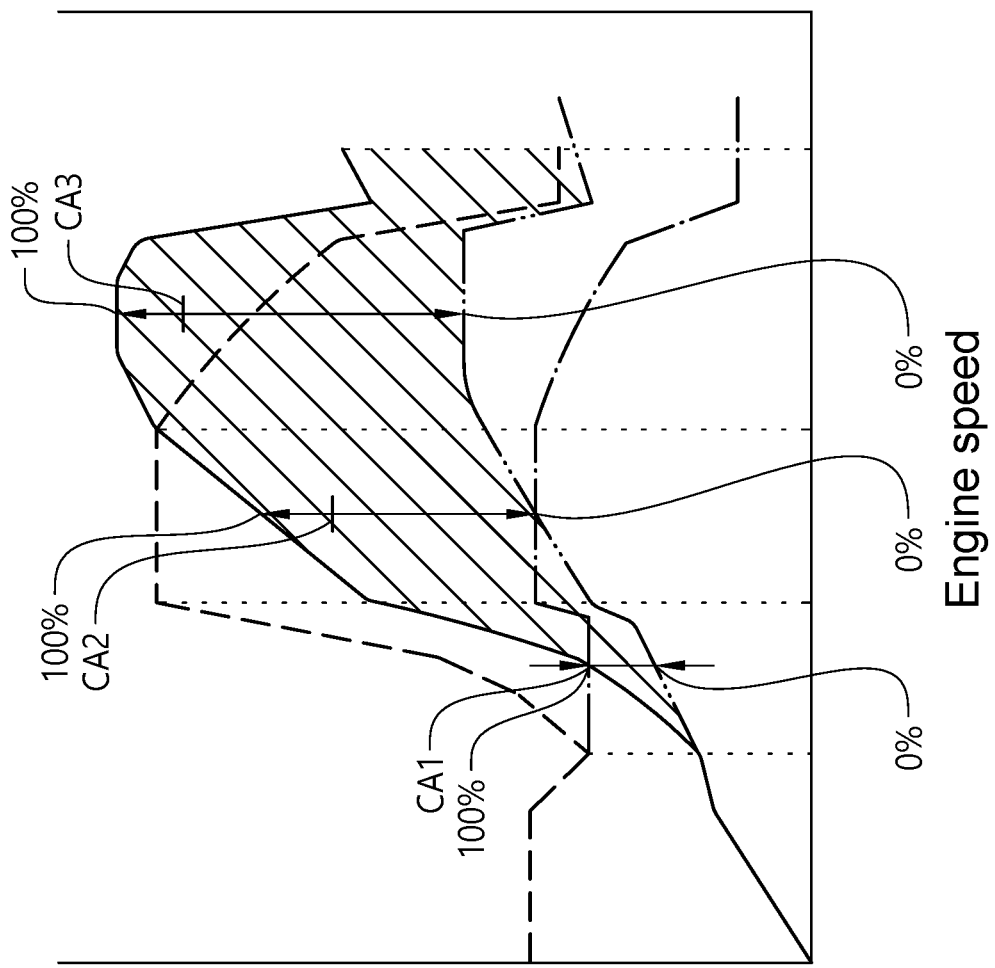

Reference is made also to FIG. 6. For each area A1-A3, a calculation of a value of the torque capacity CA1-CA3, is made in dependence on the sampled torque capacities in the respective area and at the boundaries of the respective area. Also, for each area A1-A3, a calculation of a value, not shown in FIG. 6, of the power capacity, is made in dependence on the sampled power capacities in the respective area and at the boundaries of the respective area. For each area, the torque and power capacities are expressed in percentage.

It should be noted that the calculations of the propulsive capacities of the operational areas A1-A3 may be done by the respective vehicle control unit CUV. Upon such a determination, the calculated propulsive capacities may be communicated to the central control unit CUC. In alternative embodiments, the collected operational data may be sent to the central control unit CUC, and the calculations of the propulsive capacities of the operational areas A1-A3 may be done by the central control unit CUC.

In this embodiment, the propulsive capacity operational areas also comprise an area (not shown) with engine braking of the engine 2.

It should be note that in embodiments of the invention, the propulsive capacity may include the engine torque capacity but not the engine power capacity, or vice versa. It should also be noted that the invention is applicable to other types of drive devices 2, such as electric motors. For any type of drive device 2, there may be two, three, or more operational areas. Each operational area may cover a respective interval of the rotational speed of the drive device. A propulsive capacity may be determined for each of the operational areas. For example, for electric motors, there may be two operational areas.

The method further includes mapping S3, S5, S7, S9, S10 the operational area propulsive capacities CA1-CA3 to one or more expected mission stages MS1-MS12. Thereby, the one or more expected mission stages MS1-MS12 for the respective vehicle 1, 1B are determined, based on the position and the direction of travel for of the respective vehicle.

In this embodiment, one or some of the mission stages are regarded as expected mission stages, for example the mission stage in which the respective vehicle is in, and/or the next upcoming mission stage. However, in some embodiments, all mission stages are regarded as expected mission stages.

Each capacity threshold value Ta-Tak, in table 1 above, provides a lower limit of one of the operational area propulsive capacities CA1-CA3 in one of the mission stages MS1-MS12. Thus, the capacity threshold Ta-Tak, for each combination of a operational area A1-A3 and a mission stage MS1-MS12, is indicated in table 1 above. I.e., each mission stage has a respective threshold capacity for each of the operational areas A1-A3. When mapping the propulsive capacities CA1-CA3 to the expected mission stage(s) MS1-MS12, the propulsive capacities are compared to respective capacity threshold values of the expected mission stage(s).

The respective vehicle 1, 1B is controlled in dependence on said mapping. As exemplified below, this control may involve defining, or altering, a speed profile for the respective vehicle in dependence on said mapping. Said control may also involve terminating the mission for a vehicle.

For example, if the expected mission stage is the first mission stage MS1, which includes a loading procedure of the vehicle, and if the propulsive capacity CA1 in the first area A1 is below a first capacity threshold value Ta (table 1), the vehicle control may involve avoiding S4 the loading procedure. Thereby, the mission of the vehicle may be terminated. A basis for the first capacity threshold value Ta as a lower limit of the first area propulsive capacity CA1 in the expected mission stage MS1 may be that the propulsive capacity CA1 in the first area A1, related to take-off maneuvers of the vehicle, is particularly important in the loading mission stage MS1, where the vehicle is expected to take off fully loaded.

If for example the expected mission stage MS7 is the one that includes un-loading of the vehicle, and if the propulsive capacity CA1 in the first area A1 is above a second capacity threshold value Ts (table 1), controlling the vehicle 1 in dependence on said mapping may comprise effecting, i.e. carrying through with, the un-loading. However, if the propulsive capacity CA1 in the first area A1 is below the second capacity threshold value Ts, the unloading is, in this example, avoided S6. It should be noted that the second capacity threshold value Ts may be lower than the first capacity threshold value Ta. The reason may be that the first area propulsive capacity CA1 is less important in the unloading stage MS7 than in the loading stage MS1, since the vehicle is expected to take off un-loaded, which requires less energy than for taking off fully loaded. Thus, in the unloading mission stage MS7, the first area propulsive capacity CA1 may be below the first capacity threshold value Ta of the first area propulsive capacity CA1 in the loading mission stage MS1.

In some embodiments, if the expected mission stage MS2, MS4, MS6 is any one the mission stages including the vehicle being loaded, and an uphill road gradient, and if the propulsive capacity CA2 in the second area A2 is below a third capacity threshold value Te, Tk, Tq (table 1), controlling the vehicle 1 in dependence on said mapping comprises terminating the mission, or reducing S8 the vehicle speed in the expected mission stage MS2, MS4, MS6. A basis for the third capacity threshold values Te, Tk, Tq as a lower limit of the second area propulsive capacity CA2 in the uphill and loaded mission stages MS2, MS4, MS6, may be that the propulsive capacity CA2, in the second area A2, including the maximum torque of the vehicle, is particularly important in said mission stages MS2, MS4, MS6, where a high torque is required of the vehicle.

It should be noted that a reduced capacity CA1 in the first area A1 may not disallow the vehicle from executing uphill and loaded mission stages MS2, MS4, MS6, if the propulsive capacity CA2 in the second area A2 is above the third capacity threshold value. It should also be noted that a reduced capacity CA2 in the second area A2 may not disallow the vehicle from executing loading stage MS1, if the propulsive capacity CA1 in the first area A1 is above the first capacity threshold value.

In a further example, if the expected mission stage(s) MS3, MS8, MS10, MS12 is a mission stage that includes a downhill road gradient, and if the engine brake propulsive capacity in the engine braking area is below a fourth capacity threshold value, the mission of the vehicle 1 may be adjusted or terminated S11 if the vehicle is loaded above a load threshold value. However, the expected mission stage(s) MS8, MS10, MS12 may be carried out S12 if the vehicle is loaded below the load threshold value.

In the case of termination, in a downhill stage by a loaded vehicle, due to a reduced engine braking capacity, the vehicle may be left standing. Preferably, the vehicle is driven off the road, e.g. into a separate area, before stopping. In some examples, the vehicle may be driven further, with use of its service brakes, to compensate for the loss of engine braking capacity. Such a maneuver may be controlled by the central control unit CUC based on the current position of the vehicle, the position of other vehicles, and/or the risk involved in the maneuver, such as service brake overheating.

In embodiments of the invention, if a first of the vehicles 1 is controlled so as for its mission to be altered, e.g. by changing its speed profile, or by terminating its mission, at least one of the remaining vehicles 1B may be controlled in dependence on the altered mission of the first vehicle. Thus, the remaining vehicle 1B may be controlled in dependence on the mapping of the operational area propulsive capacities CA1-CA3 of the first vehicle to the expected mission stage of the first vehicle. Thus, for example, if the first vehicle is controlled with a reduces speed in an uphill, loaded stage, the remaining vehicle 1B may be controlled with a reduced speed as well.

Figure 7:
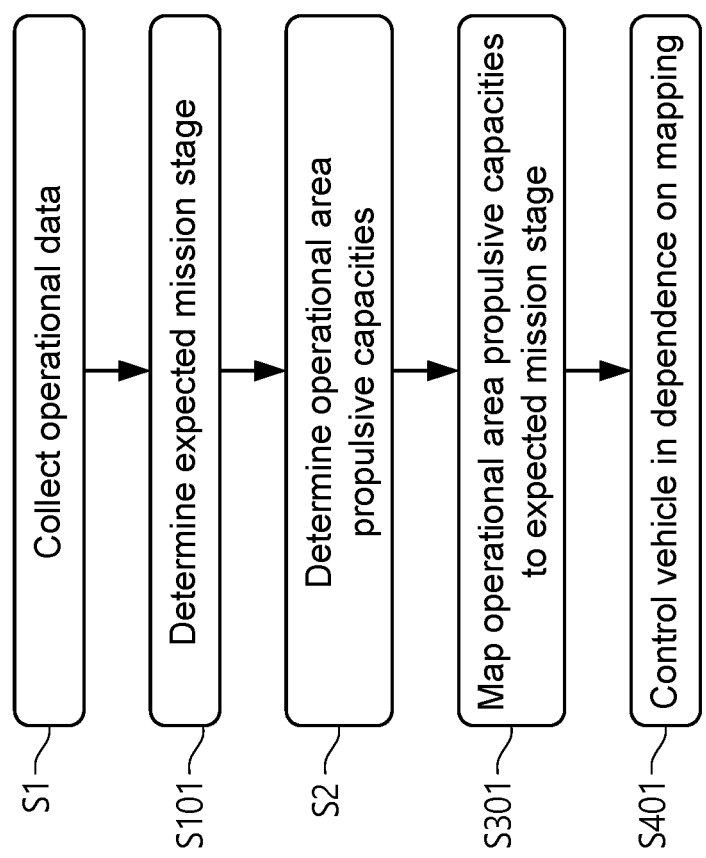
FIG. 7 is a flow diagram depicting stages in a method according to a more general embodiment of the invention.

Reference is made to FIG. 7, depicting steps in a method according to a more general embodiment of the invention. The method comprises controlling a vehicle, comprising a drivetrain comprising at least one drive device, to perform a mission comprising a plurality of stages. The method further comprises collecting S1, during the mission, operational data relevant to the operation of the drivetrain. The method further comprises determining S101 an expected mission stage. The method further comprises determining S2, in dependence on the operational data, the propulsive capacity in at least two different operational areas of the drive device. The method further comprises mapping S301 the operational area propulsive capacities to the expected mission stage. The method further comprises controlling S401 the vehicle in dependence on said mapping.

It is to be understood that the present invention is not limited to the embodiments described above and illustrated in the drawings; rather, the skilled person will recognize that many changes and modifications may be made within the scope of the appended claims.

The invention claimed is:

1. A method for controlling a vehicle comprising a drivetrain, the drivetrain comprising a drive device adapted to generate mechanical power, the method comprising:
controlling the vehicle to perform a mission comprising a plurality of stages,
collecting operational data relevant to the operation of the drivetrain, wherein the operational data indicate a de-rate of a component of the drivetrain, a fault of a component of the drivetrain, and/or an environmental condition which influences the drivetrain operation, wherein the operational data, relevant to the operation of the drivetrain, is collected during the mission, and
determining an expected mission stage,
wherein the method further comprises:
determining, in dependence on the operational data, the propulsive capacity in at least two different operational areas of the drive device, the operational areas being defined by respective different intervals of a rotational speed of the drive device,
mapping the operational area propulsive capacities to the expected mission stage,
wherein said mapping comprises comparing the operational area propulsive capacities to respective capacity threshold values of the operational area propulsive capacities in the expected mission stage, wherein each capacity threshold value provides a lower limit of the respective operational area propulsive capacity in the expected mission stage, and
controlling the vehicle in dependence on said mapping.

2. The method according to claim 1, wherein determining, in dependence on the operational data, the propulsive capacity in at least two different operational areas of the drive device, comprises determining the propulsive capacity in no more than ten operational areas of the drive device.

3. The method according to claim 1, wherein determining, in dependence on the operational data, the propulsive capacity in at least two different operational areas of the drive device, comprises determining no more than ten propulsive capacities.

4. The method according to claim 1, wherein determining, in dependence on the operational data, the propulsive capacity in at least two different operational areas of the drive device, comprises determining for each of the operational areas, a single respective propulsive capacity.

5. The method according to claim 1, wherein determining the operational area propulsive capacities comprises sampling a propulsive capacity at one or more sampling points within an operational spectrum of the drive device, which propulsive capacity sampling is done in a test rig of the drive device, with a mathematical model of the drive device, or at previous operations of the vehicle, or other vehicles.

6. The method according to claim 5, wherein by calculating a value of the respective operational area propulsive capacity in dependence on one or more of the sampled propulsive capacities.

7. The method according to claim 1, wherein the collected operational data indicate a de-rate triggered by a software, wherein determining the propulsive capacity in the at least two different operational areas of the drive device, comprises running the de-rate triggering software.

8. The method according to claim 1, wherein controlling the vehicle in dependence on said mapping comprises defining a speed profile for the vehicle in dependence on said mapping.

9. The method according to claim 1, wherein controlling the vehicle in dependence on said mapping comprises moving the vehicle to a specified position ahead, and then stopping the vehicle.

10. The method according to claim 1, wherein the propulsive capacity operational areas comprise a first area within a drive device rotational speed interval including rotational speeds at take-off maneuvers of the vehicle.

11. The method according to claim 10, wherein the vehicle is a load carrying vehicle, and the mission includes a loading procedure, the method comprising selecting a first capacity threshold value as a lower limit of the first area propulsive capacity in the expected mission stage, which the first capacity threshold value is at least partly based on an expected loading procedure of the vehicle in the expected mission stage, and, if the propulsive capacity in the first area is below the first capacity threshold value, controlling the vehicle in dependence on said mapping comprises avoiding the loading procedure.

12. The method according to claim 1, wherein the propulsive capacity operational areas comprise a second area within a drive device rotational speed interval including a maximum torque of the drive device.

13. The method according to claim 12, wherein by selecting a third capacity threshold value as a lower limit of the second area propulsive capacity in the expected mission stage, which the third capacity threshold value is at least partly based on an expected vehicle load in the expected mission stage, and/or an uphill road gradient of the expected mission stage, and, if the propulsive capacity in the second area is below the third capacity threshold value, controlling the vehicle in dependence on said mapping comprises reducing the vehicle speed in the expected mission stage.

14. The method according to claim 1, wherein the propulsive capacity operational areas comprise a third area within a drive device rotational speed interval including a maximum power of the drive device.

15. The method according to claim 1, wherein the propulsive capacity operational areas comprise an area with engine braking of the drive device.

16. The method according to claim 15, wherein the propulsive capacity of the engine braking operational area is an engine braking capacity of the vehicle, wherein the method comprises selecting a fourth capacity threshold value as a lower limit of the engine braking capacity in the expected mission stage, which the fourth capacity threshold value is at least partly based on an expected vehicle load in the expected mission stage, and/or a downhill road gradient of the expected mission stage, and the method comprising controlling the vehicle in dependence on the engine braking capacity and the fourth capacity threshold value.

17. A method of controlling a plurality of vehicles, wherein a first of the vehicles is controlled according to the method of claim 1, and the remaining vehicles are controlled to perform said mission, and at least one of the remaining vehicles is controlled in dependence on said operational area propulsive capacities and/or said mapping of the first vehicle.

18. A control unit, or a group of control units, configured to perform the method according to claim 1.

* * * * *